(12) United States Patent
Li et al.

(10) Patent No.: US 10,808,643 B2
(45) Date of Patent: Oct. 20, 2020

(54) HOMOGENOUS CHARGE ELECTROMAGNETIC VOLUME IGNITION INTERNAL COMBUSTION ENGINE AND ITS IGNITION METHOD

(71) Applicants: DONGGUAN UNIVERSITY OF TECHNOLOGY, Dongguan (CN); SICHUAN DEHONG ELECTRONIC TECHNOLOGIES CO., LTD., Zigong (CN)

(72) Inventors: Yun Li, Dongguan (CN); Wuqiao Luo, Dongguan (CN); Mouju Zou, Zigong (CN)

(73) Assignees: DONGGUAN UNIVERSITY OF TECHNOLOGY, Dongguan (CN); SICHUAN DEHONG ELECTRONIC TECHNOLOGIES CO., LTD., Zigong (CN)

( * ) Notice: Subject to any disclaimer, the term of this patent is extended or adjusted under 35 U.S.C. 154(b) by 40 days.

(21) Appl. No.: 16/228,710

(22) Filed: Dec. 20, 2018

(65) Prior Publication Data
US 2019/0331051 A1    Oct. 31, 2019

Related U.S. Application Data

(63) Continuation of application No. PCT/CN2018/087752, filed on May 22, 2018.

(30) Foreign Application Priority Data

Apr. 28, 2018    (CN) .......................... 2018 1 0404024

(51) Int. Cl.
*F02D 41/30*    (2006.01)
*F02D 37/02*    (2006.01)
*F02B 1/06*    (2006.01)

(52) U.S. Cl.
CPC ............ *F02D 41/3076* (2013.01); *F02B 1/06* (2013.01); *F02D 37/02* (2013.01);
(Continued)

(58) Field of Classification Search
CPC ..................................................... F02P 23/045
See application file for complete search history.

(56) References Cited

U.S. PATENT DOCUMENTS 3,934,566 A * 1/1976 Ward ...................... F02P 9/007
                                                          123/275
4,446,826 A * 5/1984 Kimura ................. F02P 23/045
                                                          123/143 B (Continued)

*Primary Examiner* — Sizo B Vilakazi
*Assistant Examiner* — Anthony L Bacon
(74) *Attorney, Agent, or Firm* — Hemisphere Law, PLLC; Zhigang Ma

(57) ABSTRACT

A homogenous charge electromagnetic volumetric ignition (HCEMVI) internal combustion engine (ICE) and its ignition method are disclosed in the present invention. The HCEMVI ICE includes a control module of the engine, an electromagnetic wave source, an electromagnetic wave coupling module and the cylinders of the ICE. Its ignition method is stated as: the control module of the engine controls the electromagnetic wave generation and, when the piston of a cylinder containing an air-fuel mixture moves to the preset ignition advance angle, the electromagnetic wave source is commanded to generate an electromagnetic wave at a frequency in accordance with the resonant frequency of the cylinder head at the advance angle. The electromagnetic wave is transmitted into the cylinder by the coupling module to create a strong electric field through electromagnetic resonance in the cylinder head and initiate volumetric ignition and bulk combustion of the air-fuel mixture inside the cylinder of the engine.

34 Claims, 8 Drawing Sheets

(52) U.S. Cl.
CPC .... *F02D 41/3041* (2013.01); *F02D 2200/021* (2013.01); *F02D 2200/0411* (2013.01)

(56) References Cited

U.S. PATENT DOCUMENTS

| | | | | |
|---|---|---|---|---|
| 4,561,406 | A * | 12/1985 | Ward | F02B 23/08 123/143 B |
| 5,845,480 | A * | 12/1998 | DeFreitas | F02C 7/264 60/776 |
| 8,226,901 | B2 * | 7/2012 | Makita | H05H 1/46 422/186.21 |
| 2009/0229581 | A1 * | 9/2009 | Ikeda | B01D 53/32 123/536 |
| 2016/0281674 | A1 * | 9/2016 | Ikeda | F02P 23/04 |
| 2017/0251546 | A1 * | 8/2017 | Ikeda | H01T 13/22 |
| 2017/0276109 | A1 * | 9/2017 | Ikeda | F02M 57/06 |
| 2017/0276110 | A1 * | 9/2017 | Ikeda | F02M 57/06 |

* cited by examiner

HOMOGENOUS CHARGE ELECTROMAGNETIC VOLUME IGNITION INTERNAL COMBUSTION ENGINE AND ITS IGNITION METHOD

BACKGROUND OF THE INVENTION

1. Field of the Invention

The present invention is concerned with the automotive industry, fuel combustion and electronic technology. More specifically, the invention relates to an air-fuel pre-mixed homogeneous charge electromagnetic volumetric ignition internal combustion engine and its ignition method.

2. Description of Related Art

The most commonly used ignition systems in internal combustion engines (ICEs) are classified into two main types: (a) spark ignition (SI), which ignites air-fuel mixture with high voltage discharges; and (b) compression ignition (CI), which ignites fuel with compressed air at a high temperature. Spark ignition can be applied to gasoline engines, natural gas engines, and bi-fuel (gasoline and natural gas) engines, as well as electric and ICE hybrid engines. Compression ignition is mainly used for diesel engines. Take the gasoline engine as an example for SI. A pulse of voltage of over $8\text{-}10^3$ V is applied between two electrodes of the sparkplug inside the ICE cylinder, where the distance between the two electrodes is no more than 1 mm. This creates an equivalent instantaneous electric field of $8\times10^6$ V/m between the electrodes, where discharges occur under this strong electric field, leading to ignition and combustion of the air-fuel mixture inside the ICE cylinder. The sparkplug in the natural gas engine follows the same ignition principle. Because the minimum energy required to ignite natural gas is more than gasoline, the distance between the electrodes is hence shortened to 0.3-0.45 mm, resulting in an electric field with a higher equivalent field strength to provide a higher ignition energy.

Table 1 shows the characteristics of gasoline and natural gas at 0 degree centigrade and 1 atm:

TABLE 1 the characteristics of gasoline and natural gas (at 0 degree centigrade and 1 atm)

| | Fuel | |
| --- | --- | --- |
| | Gasoline | Natural gas |
| Molecular formula | $C_nH_{1.87n}$ | $CH_4$ (82.2%) |
| Density (kg/m$^3$) | 750 | 0.782 |
| Ignition point (° C.) | 220-470 | 630-730 |
| Ignition advanced angle (°) | 5-40 | 15-50 |
| Air-fuel ratio in theory | 14.6 | 16.34 |
| Minimum energy to ignite fuel in air (mJ) | 0.24 | 0.29 |

The distance between the electrodes is usually very small (about 1 mm) to guarantee the discharges, even smaller for the natural gas engine. In other words, the discharge only occurs in a small area, which is just a point compared with the entire volume of the cylinder. Therefore, combustion begins with a single point of chemical reaction, which often results in incomplete combustion and loss of energy efficiency due to the SI point ignition method.

Unlike SI, in CI, the air is first heated in the cylinder by the compression within a short period of time. The temperature of the air has reached the ignition point of diesel when the fuel is sprayed into the cylinder and the combustion starts. The ignition performance, and the initial stage of combustion, is much affected by how the diesel is sprayed into the air, but the spray creates a larger volume of ignition. Hence, the CI performance is better than SI. Because the ignition temperature of diesel is higher than gasoline, however, the CI temperature is higher than SI, leading to more $NO_x$ chemical reactions and exhaust emissions. Another issue of CI is that, the combustion often results in more emission of $PM_{10}$ and other particulate matter, which can hardly be neutralized with a catalytic converter.

The ignition method and timing are different with different types of fuels. For a dual fuel ICE, the ignition timing is often set to a compromised timing so as to accommodate both types of fuels.

The difference between SI and CI results in different engine structures. Usually, the cylinder of the diesel engine is built to stand higher pressures and temperatures. The cylinder wall of the CI engine has to be thicker than that of the gasoline engine. As a result, the cost of a CI vehicle is higher than an SI one.

Combing both the SI and CI methods, a homogeneous charge compression ignition (HCCI) engine uses compression like in a CI engine to ignite the air-fuel mixture like in an SI engine, thereby igniting a larger volume of fuel in the cylinder and thus delivering certain combined merits of SI and CI. Mazda has recently developed a new type of HCCI engine (CN104047766A), which uses sparks to assist the HCCI. It has been proven by Mazda that HCCI can largely increase the energy efficiency and improve combustion performance. However, as opposed to open-loop control for an SI engine, all HCCI control methods are based on closed-loop control, requiring real-time sensing of in-cylinder pressure and/or temperature. Hence, in HCCI, it is difficult to predict or control practically how and when the temperature rises to the ignition point. Before Mazda, General Motor Corporation (CN101454551B), Toyota (CN100416058C) and other ICE manufacturers had filed several patents on HCCI but only has Mazda brought this technology to products.

In the present invention, electromagnetic wave, such as microwave, is used as the energy source on air-fuel mixtures to create volumetric ignition, as opposed to the point ignition like in an SI engine and to the stratified ignition like in a CI engine. The use of electromagnetic wave as the ignition source leads to the homogeneous charge electromagnetic volumetric ignition (HCEMVI) ICE. The electromagnetic frequency of an HCEMVI engine is at or is closest possible to the resonant frequency of the cylinder head corresponding to the piston position at the point of optimal ignition. Compared with existing engines, the HCEMVI engine of this invention offers the following merits: 1) it is based on open-loop control, similar to SI, without the need for costly (and often inaccurate) in-cylinder pressure or temperature sensing; 2) an HCEMVI system can be installed in a modern gasoline engine without changes to its mechanical structure, air-fuel charge ratio or compression ratio; 3) lean combustion limit is increased from SI, which reduces fuel consumption; 4) it results in higher energy efficiency and lower $CO_2$ and pollutant emissions per mile; 5) the combustion is more stable than SI; 6) it increases the cost-performance ratio of the vehicle and would save the costs associated with other vehicle components such as the cooling system, the catalytic converter, and the particulate filter, 7) it is easy to adapt to different engine types including gasoline, natural gas, dual fuel, and hybrid engines.

In recent years, researchers have undertaken much work to introduce electromagnetic wave as an ignition means to the internal combustion engine (CN102360868, CN102410126, CN105822484A). However, difficulties still exist in ensuring that an adequate power of electromagnetic waves can be delivered at optimal ignition advance angles, and that power supply to the wave source can be adequately provided by the onboard vehicle accumulator.

In an internal combustion engine, the cavity geometry of a fixed-shape cylinder is not fixed due to the movements of the piston. Hence, the resonant frequency of the cylinder head varies as the piston moves. At present, in related art, the frequency of the electromagnetic wave used is fixed, such as 2.45 GHz generated by a magnetron, which is based on a vacuum tube. This fixed-frequency electromagnetic wave cannot adapt itself to resonance or to different engine conditions, causing resonant frequency mismatch and hence requiring an impractically high power supply of the onboard vehicle accumulator.

SUMMARY OF THE INVENTION

The present invention provides an air-fuel premixed homogenous charge electromagnetic volumetric ignition (HCEMVI) internal combustion engine (ICE) and its ignition method. This invention differs from existing related art (e.g., CN102360868, CN102410126, CN105822484A) in that the electromagnetic wave frequency in this HCEMVI method is varied to match or be closest possible to the resonant frequency of the cylinder head corresponding to the piston position at optimal ignition advance angle at all speeds. This method makes the electromagnetic wave resonant in the cylinder head at the required time of ignition for each engine and hence requires a minimal power input from the onboard vehicle accumulator. Finally, the ignition timing can be controlled precisely by controlling the electromagnetic wave injection time, avoiding unnecessary plasma generation that decreases the strength of the resonant electromagnetic field (CN101981305, U.S. Ser. No. 10/066, 520).

Technical details in the present invention: one kind of HCEMVI of an ICE with one or more cylinders and an electronic engine control unit, an electromagnetic wave source with its power supply, an HCEMVI coupling module with its electromagnetic wave emitters and transmission lines. The coupling module connects the electromagnetic wave source to the cylinders of the engine. The engine control module controls the ignition timing and the generation of the electromagnetic waves. The frequency of the electromagnetic wave source is adjusted to meet different resonant frequencies for different conditions and types of the engine, which ensures that this invention suits all types of air-fuel premixed engines and different types of fuels.

Fuel and air are mixed before the injection of the electromagnetic wave, such as microwave.

The frequency of the electromagnetic wave is adjusted closest possible to the resonant frequency of the cylinder head when the piston is at the optimal ignition advance angle according to the engine speed. The resonant frequency is pre-determined by the cylinder shape and the piston position.

The optimal ignition advance angles are pre-determined by the engine speed, or can be pre-set at a fixed angle such as the usual $-5°$ to top dead center (TDC).

The electromagnetic wave generated by the electromagnetic wave source is no less than 100 W and no more than 200 W.

Wherever required, the frequency range of the electromagnetic wave source is set within the international common unlicensed bands, which are: 900 MHz-949 MHz, 2.4 GHz-2.5 GHz and 5 GHz-5.825 GHz, thereby avoiding interruption to licensed communication frequencies, despite that the coupling modules in this invention are screened in the ICE and hence will not cause electromagnetic interference.

Different countries have different standards regarding licensed bands. (https://en.wikipedia.org/wiki/List_of_WLAN_channels#900_MHz_(802.11ah). In China, for example, 5500 MHz to 5745 MHz and 5035 MHz to 5170 MHz are not set for public use. Bands of 430 Mhz to 440 MHz and 868 MHz to 915 MHz are extra public bands. For most communications, the output power is usually no more than 1 W, but the power level can be increased with certain purchased licenses.

The engine control module monitors the position of the piston and commands the electromagnetic wave source to generate electromagnetic wave as the piston reaches the designated position.

The designated position is at the optimal ignition advance angle or close to the TDC. In the latter case, the electromagnetic wave is injected into the cylinder very slightly ahead of the ignition time to allow time for the resonant ignition to occur during the movement of the piston, although this extra time is negligible.

The ignition time is also determined by the speed of the engine.

The engine control module sets up the ignition time.

The ignition advance angle for each speed in the required speed range for 50% fuel to be combusted when the piston reaches $-5°$ TDC for example.

Based on the ignition advance angle, the resonant frequency is calculated with respect to the geometry of the cylinder and the emitter of the coupling module.

The electromagnetic wave source includes a power supply, an electromagnetic wave generator and a power device. The power supply is used to power the electromagnetic wave generation. The electromagnetic wave frequency is adjustable in the electromagnetic wave generation.

The circuit in the electromagnetic wave generator is a feedback oscillation circuit, which includes but is not limited to LC oscillation or transistor oscillators.

The number of electromagnetic wave generators is at least 1. When the number of electromagnetic wave generator is 1, the power device is also a power amplifier. When the number of electromagnetic wave generator is more than 1, the power device is a power synthesizer which is used to synthesize the different phases in the different electromagnetic wave generators. The power amplifier is to ensure that the output electromagnetic wave delivers a suitable power level at the required frequency.

The feedback oscillation circuit uses adaptable capacitance or adaptable inductance to adjust oscillation frequency.

The power supply is provided by the vehicle DC accumulator.

The power device consists of semiconductors including transistors and field-effect transistors.

The semiconductors in the feedback oscillation circuit includes but not limit to avalanche diodes, bulk diodes, bipolar transistors, field-effect transistors and laterally diffused metal oxide semiconductors.

The electromagnetic wave source also contains a heat sink and/or a temperature compensation circuit. The heat sink and/or the temperature compensation circuit are connected to the power device. The heat sink is used for heat radiation when the power device is working. The temperature compensation circuit compensates the temperature effect to the power device.

The electromagnetic wave source also contains a boost circuit, which is connected between the power supply and the electromagnetic wave generator. The boost circuit works when the vehicle DC source is unable to provide enough voltage to power the electromagnetic wave generator.

When the voltage from the power supply is lower than the specified number, the boost circuit is turned on.

The coupling module connects the electromagnetic wave source to the cylinder. The coupling antenna is installed into the sparkplug port of which the shape meets the size of the port. Part of the antenna is extended into the cylinder.

The coupling module contains a coupling antenna, which is connected to a transmission line.

The shape and size of the transmission line is designed based on the equivalent impedance and the shape of the cylinder head. The design should meet the requirement of impedance matching as a different antenna shape has different impedance. For the transmission line, impedance matching needs to be considered. Usually the impedance of a coaxial transmission line is 50 or 75 ohms. A small resistive device may be connected to the transmission line in series or in parallel to adjust the impedance of the transmission line.

The transmission line consists of a center conductor, an insulating layer and an outer-layer conductor. The center conductor is in the middle, surrounded by the insulating layer. The outer-layer conductor covers the insulation layer. These three layers have no gap between each other.

The coupling antenna includes a center antenna and an outer-layer antenna. The outer-layer antenna is built around the center antenna.

The center antenna is the extension of the center conductor. The outer-layer antenna is all, or part, of the extension of the outer-layer conductor.

The diameter of the center conductor and the thickness of the insulting layer are determined by the equivalent impedance of the cylinder head.

The insulting layer is covered with dielectric insulation material.

The outer-layer antennas are arranged in arrays along the extension direction of the outer-layer conductor. The arrays can be close together or dispersed around the center antenna. The top end of the antennas is open to air. The outer-layer antennas are arranged around the center antenna in a claw-like structure.

The transmission line is a coaxial line or a waveguide, which transmits electromagnetic waves to the antennas.

In the present invention, an electromagnetic volumetric ignition method is also provided for the air-fuel premixed homogenous charge electromagnetic volumetric ignition internal combustion engine, which is:

When the control module of the engine detects the position of the piston reaching the preset ignition advance angle, it sends an ON signal to the electromagnetic wave source. The electromagnetic wave source generates and transmits an electromagnetic wave at the same frequency as or a frequency closest possible to the resonant frequency of the cylinder for the preset ignition advance angle. The electromagnetic wave is transmitted through the coupling module and the antenna. Volumetric ignition occurs in the resonant electromagnetic field, which is strongly created by the electromagnetic wave resonance inside the cylinder.

By option, the output power of the electromagnetic wave source is no less than 100 W and no more than 200 W. The strength of the electromagnetic field under electromagnetic wave resonance can reach $10^6$ V/m.

By option, the preset position of the electromagnetic wave injection timing is ahead of ignition advance angle.

In the application example of this invention, the electromagnetic wave source adopts and makes full use of the vehicle DC power supply. This offers cost reductions compared with existing methods of electromagnetic wave generation that uses a magnetron and hence requires an extra converter to boost voltage for power supply.

In the present invention, the electromagnetic wave frequency is controllable under all sorts of engines with various fuel types. The electromagnetic wave is generated with the same frequency as the resonant frequency of the cylinder head at each different ignition advance angle for different engines. The chance of frequency mismatch is decreased and the ignition success is ensured. In addition, most commonly adopted frequency in existing inventions concerning electromagnetic wave ignition is set to 2.45 GHz due to the fixed magnetron geometry. A fixed magnetron geometry can only generate fixed-frequency electromagnetic waves. Frequency mismatch often occurs if the magnetron is used as the electromagnetic wave source. The strength of the electromagnetic field decreases quickly with a frequency mismatch, resulting in a low success rate of ignition.

Impedance match is covered by designing the antenna to cover the equivalent impedance of the cylinder head. Thus, the energy reflection is at the lowest under impedance matching. It takes no more than 200 W of the input power for the electromagnetic wave source to create a strong enough electric field for successful ignition.

Finally, the ignition timing can be controlled precisely by controlling the electromagnetic wave generator circuitry. This avoids unnecessary plasma generation that decreases the strength of the resonant electromagnetic field.

BRIEF DESCRIPTION OF THE DRAWINGS

In this part, pictures and diagrams are provided as examples to aid understanding of the present invention and to illustrate its applications, but should not restrict the applications.

DETAILED DESCRIPTION OF THE PREFERRED EMBODIMENTS

Examples are explained in the following along with diagrams to aid understanding of the techniques applied to realize the present invention.

In the present invention, the frequency is controllable in the electromagnetic wave source. It is easy to adjust the output frequency to the resonant frequency of the cylinder head, which is affected by the fuel type and the ignition advance angle. Thus, the techniques in this invention provide strong applicability and generality.

Once the engine and fuel are known, the ignition advance angle can be determined. As in a spark ignition engine, the ignition advance angle is determined based on the middle to high speed of the engine.

Figure 16:
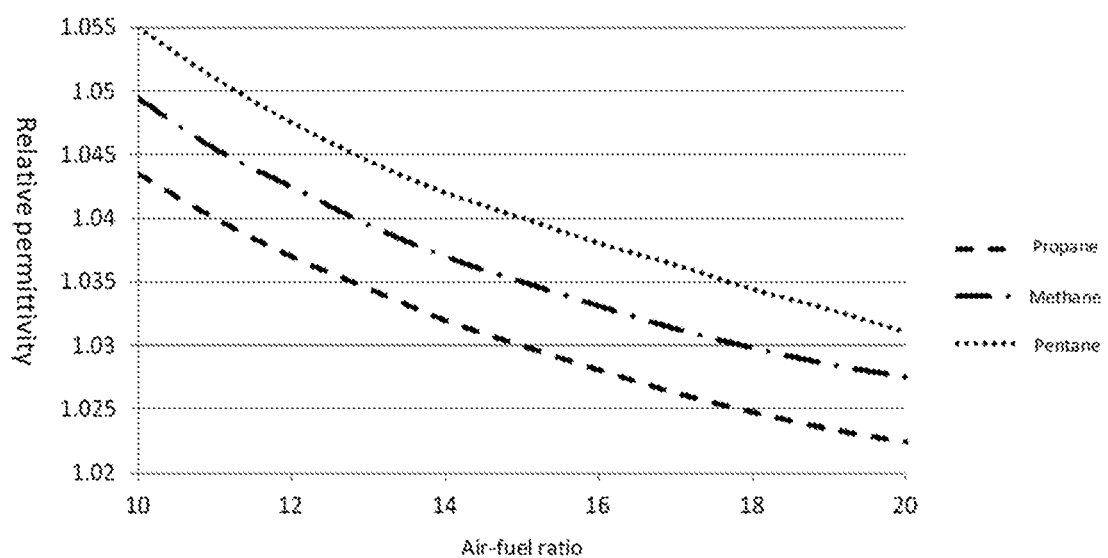
Figure 17:
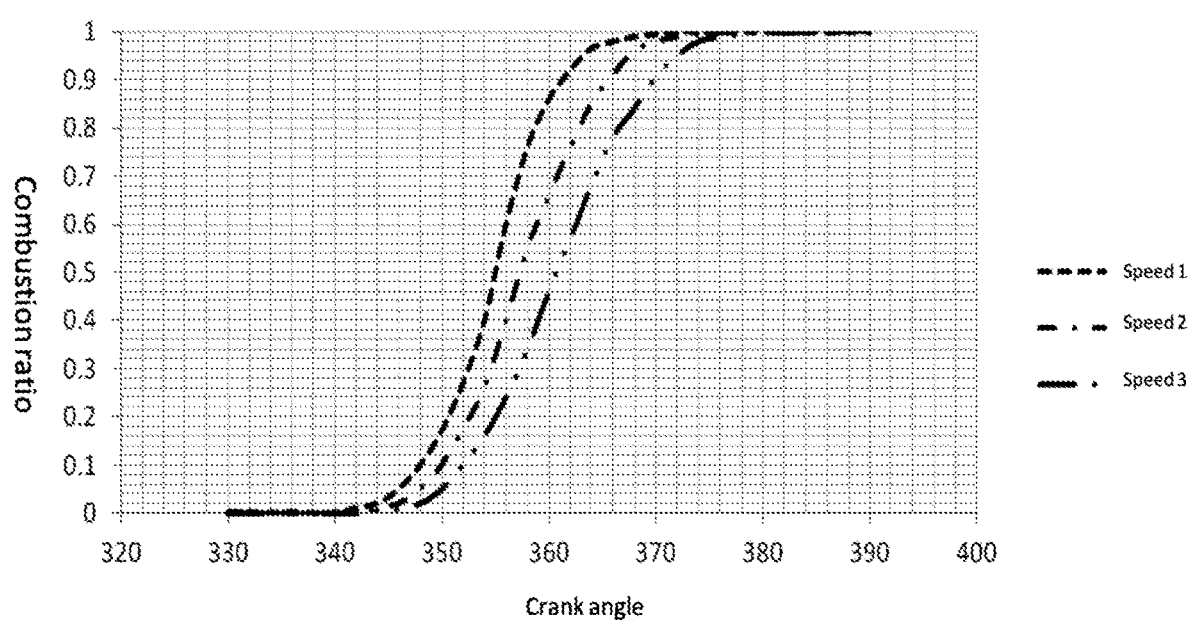

Piston movement and air-fuel ratio variation should both be taken into consideration when determining the ignition advance angle for the HCEMVI engine. FIG. 16 shows that the relative dielectric constant of fuel changes with the air-fuel ratio. The resonant frequency changes if the relative dielectric constant of fuel changes in a constant space. There is an optimal ignition advance angle for each engine speed due to different piston position. This angle is defined as the ignition angle from which, when the piston moves to $-5°$ TDC, the combustion of 50% of the entire fuel has just occurred (the so-called 'CA50'). FIG. 17 illustrates the combustion speed vs. engine speed with fixed ignition advance angles. An optimal ignition advance angle is selected to satisfy CA50.

The sensitivity of the resonant frequency under a moving piston needs to be considered. The sensitivity is defined as how long the mistuning happens after the resonance has occurred in the cylinder. Studies show that the sensitivity decays when the piston moves away from the TDC. Finally, the ignition advance angle is determined based on the air-fuel ratio, the engine speed and the sensitivity of the resonant frequency.

The following describes an application of the present invention.

Figure 9:
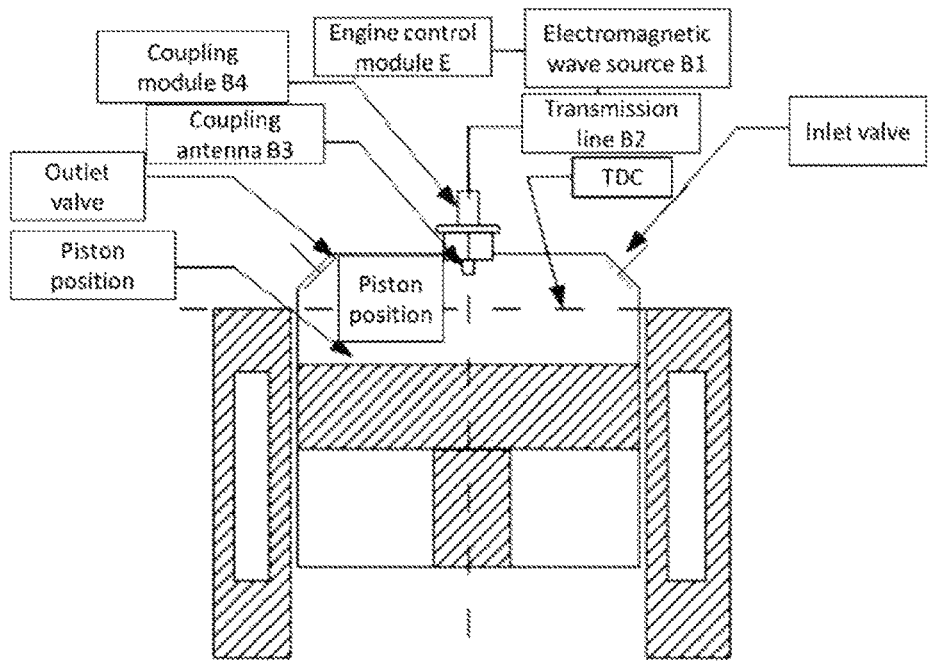

FIG. 9 depicts an illustrative type of air-fuel pre-mixed HCEMVI engine. The engine consists of an inlet valve, an outlet valve, a piston and a cylinder. The piston moves up and down in the cylinder. The piston position refers to a moving position of the piston. The fuel can be gasoline, natural gas, biofuels or diesel. Any engine that is suitable for spark ignition would be a suitable application of the present invention.

Figure 1:
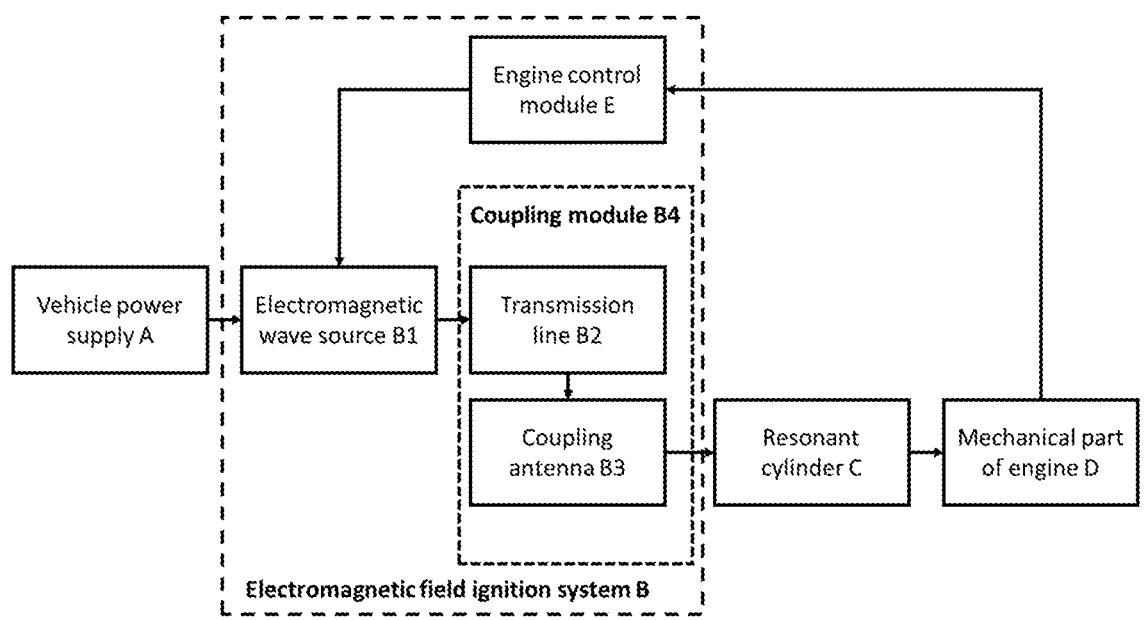
FIG. 1 Functional structure of a homogeneous charge electromagnetic volumetric ignition internal combustion engine FIG. 2 Illustration of the first type structure of the coupling module FIG. 3 Illustration of the second type structure of the coupling module FIG. 4 3D electric field of one example with the first type structure of the coupling module at resonance FIG. 5 Electric field distribution of the example with the first type structure of the coupling module at resonance FIG. 6 3D electric field of another example with the second type structure of the coupling module at resonance FIG. 7 Electric field distribution of the example with the second type structure of the coupling module at resonance FIG. 8 Flowchart of the homogenous charge electromagnetic volumetric ignition method FIG. 9 Structure of one cylinder of the homogenous charge electromagnetic volumetric ignition ICE FIG. 10 First example of the electromagnetic wave source FIG. 11 First example of the electromagnetic wave generator FIG. 12 Second example of the electromagnetic wave source FIG. 13 Example of a bipolar transistor feedback oscillation circuit FIG. 14 Example of a GaAs metal semiconductor field-effect transistor oscillation circuit FIG. 15 DC boost circuit FIG. 16 Relative dielectric constant of three different fuels under different air-fuel ratios FIG. 17 Combustion ratios under different engine speeds

As shown in FIG. 1, the ignition system B includes an engine control module E, an electromagnetic wave source B1, a coupling module B4 and a cylinder C. The electromagnetic wave source and the coupling module are connected by a transmission line B2. The coupling module includes a coupling antenna B3 and the transmission line B2.

The coupling module along with the cylinder C forms a resonant structure similar to a circuit of capacitance and inductance. The engine control module monitors the engine speed and turns on electromagnetic wave source B1 when the piston reaches the preset ignition position. The electromagnetic wave generated in B1 is transmitted through the coaxial transmission line B2 to the coupling antenna B3, and reaches the cylinder C. The coupling antenna B3 is located at the sparkplug port of the cylinder C. The antenna has a similar structure to the sparkplug so that a sparkplug engine can be upgraded easily to an HCEMVI engine. The structure shown in FIG. 9 is one example application of the present invention, while the invention is applicable to many other engines such as a 4-valve or 5-valve cylinder.

The following is the principle of HCEMVI design.

The fundamental principle is to let the electromagnetic wave resonate in the cylinder where the injected electromagnetic wave has the same frequency as the resonant frequency of the cylinder.

The cylinder resonant frequency is not constant because of the moving piston. The frequency varies continuously as the piston moves. The resonant frequency is determined by the piston position given the fuel type. With a typical ignition advance angle such that 50% fuel is burned, for example, the resonant frequency can be calculated for the piston position at $-5°$ TDC.

The frequency of the electromagnetic wave generated by a magnetron is fixed if a magnetron is used. When the injected electromagnetic wave frequency is away from the resonant frequency of the cylinder, the strength of the electric field generated drops rapidly. It is hard to ignite fuel in this situation and hence this invention uses a semiconductor electromagnetic wave generator.

Thus in this invention, the electromagnetic wave frequency is controllable to avoid mistuning.

Meanwhile, impedance matching is implemented in the coupling module: the minimum power of electromagnetic wave required to be injected into the cylinder with minimum reflection. It also increases the magnification times of the electric field strength under resonance.

The power of the electromagnetic wave should be no less than 50 dBm or 100 W to guarantee the strength of the electric field.

The following is the core concept in this invention.

Usually the engine speed is from 650 rpm to 7200 rpm. The ignition advance angle is different at a different engine speed. A natural gas engine has an ignition advance angle 8 to 10 degrees ahead of that of the gasoline engine at the same speed. A duel fuel engine has an ignition advance angle that is slightly ahead of the gasoline engine but behind the natural gas engine.

For a known engine speed, tests are carried out to find the optimal ignition advance angle that satisfies CA50. Moreover, the ranges of the cylinder resonant frequencies and piston positions are obtained by calculations and experiments.

Based on the relationships between the engine speed and the ignition advance angle and between the cylinder resonant frequency and the ignition advance angle, the preset ignition advance angle and the frequency of the injected electromagnetic wave are set up. When the engine is running, the engine control module notifies the electromagnetic wave source when to generate electromagnetic wave with the preset frequency. Then the electromagnetic wave becomes resonant when the piston reaches the preset position. Once the resonance occurs, a strong electric field is created to ignite the air-fuel mixture.

The electromagnetic wave is controllable in this invention. Thus corresponding to the type of fuel that is used for the engine, the ignition advance angle and the cylinder resonant frequency are determined. The electromagnetic wave source is set to generate the determined frequency of the electromagnetic wave.

In practical applications, the frequency of the injected electromagnetic wave will have a small offset to the cylinder resonant frequency at ignition advance angle. Hence the frequency of the injected electromagnetic wave is determined ahead of the ignition advance angle so that the resonance will occur after the piston moves after the injection of the electromagnetic wave. This reduces mistuning and guarantees ignition.

Solution of Optimum Coupling:

The coupling module has an output impedance while the cylinder has an input impedance. In an ideal situation, the output impedance of the coupling module should be the same as the input impedance of the cylinder. The reflection of electromagnetic wave transmission will thus be as low as zero.

The input impedance of the cylinder varies because the shape of the cylinder varies. This makes impedance matching difficult to realize. If the impedance is not fully matched, the reflection of electromagnetic wave will be large. This will reduce the strength of the electric field generated by resonance and cannot provide enough energy for ignition. This issue is addressed in this invention.

The output impedance of the coupling module is based on the shape and structure of the coupling antenna. In this invention, the coupling antenna is designed to satisfy the impedance matching requirement. Under impedance match, the input electromagnetic wave power is no more than 200 W. Usually 100 W of input power is adequate for ignition under resonance.

The following is one example application of the HCEMVI engine.

As shown in FIG. 1, the HCEMVI system B includes an engine control module E, an electromagnetic wave source B1, a coupling module B4, which consists of a transmission line B2 and a coupling antenna B3. The HCEMVI system B transmits electromagnetic wave to the cylinder C, and the cylinder C drives the mechanical part of the engine D. The HCEMVI system B is powered by the vehicle power supply A.

As shown in FIG. 9, fuel and air are premixed. The engine control module E monitors the position of the piston and sends a command to the electromagnetic wave source B1 when the piston reaches the preset position. The resonance occurs during the process of piton moving. The resonant frequency of the cylinder C is the same as the electromagnetic wave frequency from the electromagnetic wave source B1.

The electromagnetic wave source B1 generates electromagnetic wave once receiving the command from the engine control module. The generated electromagnetic wave is at the same frequency as or a frequency closest possible to the resonant frequency of the cylinder head. The electromagnetic wave is transmitted to the coupling module B4.

The coupling module B4 transmits the electromagnetic wave to the cylinder C. Resonating inside the cylinder head, the electromagnetic wave creates an electric field strength exceeding the threshold intensity for ignition. The input power of the coupling module B4 is no less than 100 W and no more than 200 W.

The extension part of the coupling module B4 extends into the cylinder C through the sparkplug port, mostly to the space surrounded by the outer-layer antenna and the isolating layers. The cylinder forms a resonant cavity for the electromagnetic wave. The resonant electric field reaches a strength over $10^6$ V/m, which is the threshold intensity of ignition.

The following is one example of the HCEMVI method.

Figure 8:
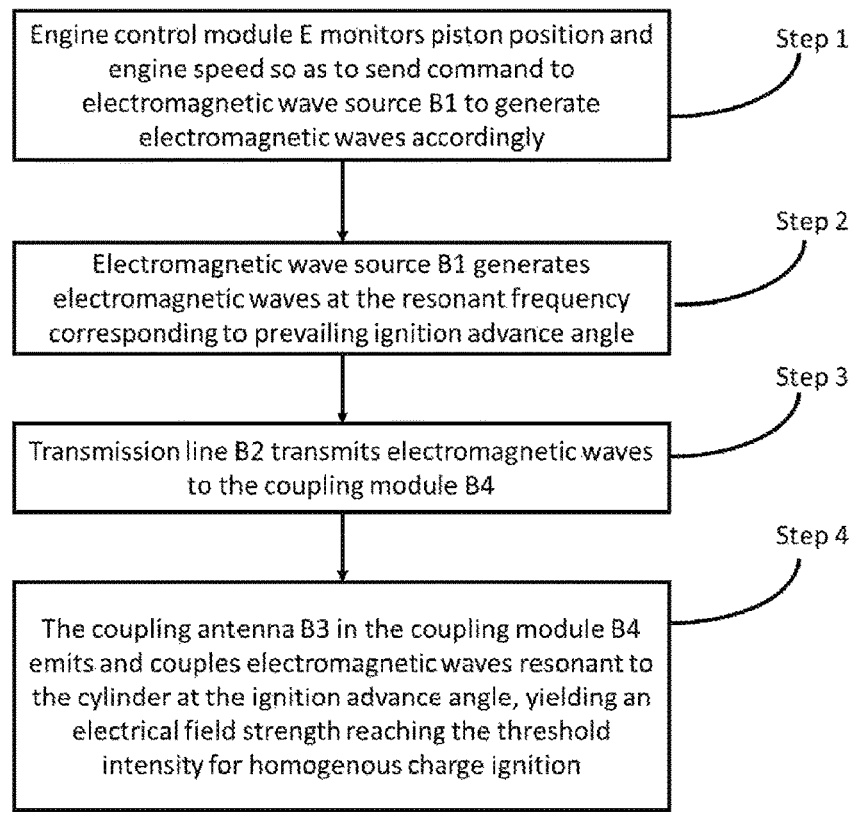

FIG. 8 shows the flowchart of the HCEMVI method, including:

Step 1: Monitor the piston position and send commands to the electromagnetic wave source B1 to generate electromagnetic wave just before the ignition advance angle.

Step 2: Generate electromagnetic wave at the resonant frequency or its closest possible with the current ignition advance angle and engine speed by the electromagnetic wave source.

The power of the electromagnetic wave should be no less than 100 W and no more than 200 W.

Step 3: Transmit the electromagnetic wave at the resonant frequency or its closest possible of the cylinder head to the coupling module.

Step 4: Transmit the electromagnetic wave by the coupling module to resonant in the cylinder and generate an electric field with the strength reaching threshold intensity of ignition.

The strength of the electric field is above $10^6$ V/m.

The following is an example electromagnetic wave source in the HCEMVI engine.

Electromagnetic wave source in the present invention includes a DC power supply, an electromagnetic wave generation circuit and a power device.

The DC power supply is powered by the vehicle DC power supply.

The electromagnetic wave generation circuit generates electromagnetic wave with adjustable frequency. The frequency is set as the resonant frequency or its closest possible of the cylinder head at the ignition advance angle. The electromagnetic wave generation circuit is realized by a feedback oscillation circuit.

The power device is used to adjust the phase of the electromagnetic wave or amplify the electromagnetic wave.

Optionally, in this example, if the voltage of the vehicle DC power is lower than the required voltage of the electromagnetic wave source, e.g. 42V, a boost circuit is used to ensure that the power supply provides adequate voltage for the electromagnetic wave source to generate electromagnetic wave that is no less than 100 W and no more than 200 W.

Optionally, in this example, the electromagnetic wave source may contain one or more generation circuits.

If the electromagnetic wave source has only one generation circuit, the power device is also a power amplifier.

If the electromagnetic wave source has more than one generation circuit, the power device is used to unify the phases of the electromagnetic waves such that electromagnetic waves from the different generation circuits can be added together.

Optionally, in this example, the electromagnetic wave source may include a heat sink and a temperature compensation circuit to deal with the heat generated by the power device. The heat sink is used for heat dissipation.

The temperature compensation is used to compensate for the temperature effects.

There are many ways to implement the electromagnetic wave source. The following are for illustration.

Figure 10:
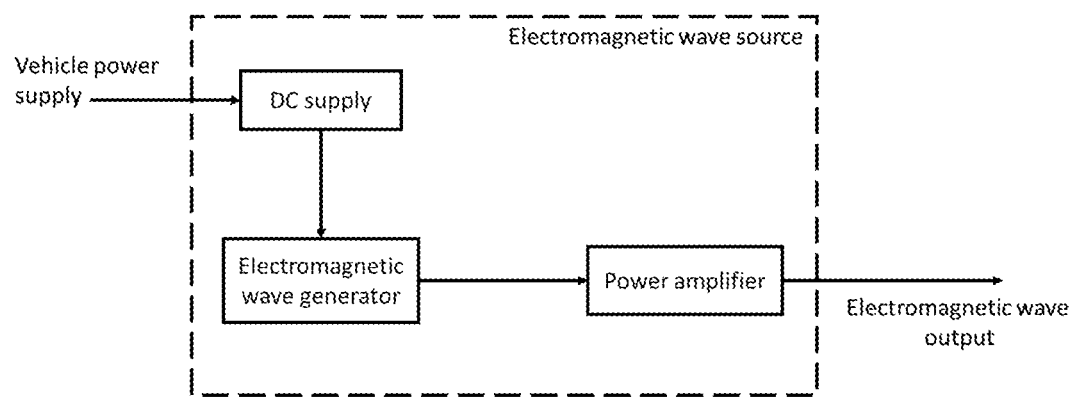

FIG. 10 shows an example of the electromagnetic wave source, which includes a DC power supply, an electromagnetic wave generator and a power amplifier.

The power supply is powered by the vehicle power supply. Whether a boost circuit is needed or not depends on whether the voltage from the vehicle power supply is high enough.

Figure 15:
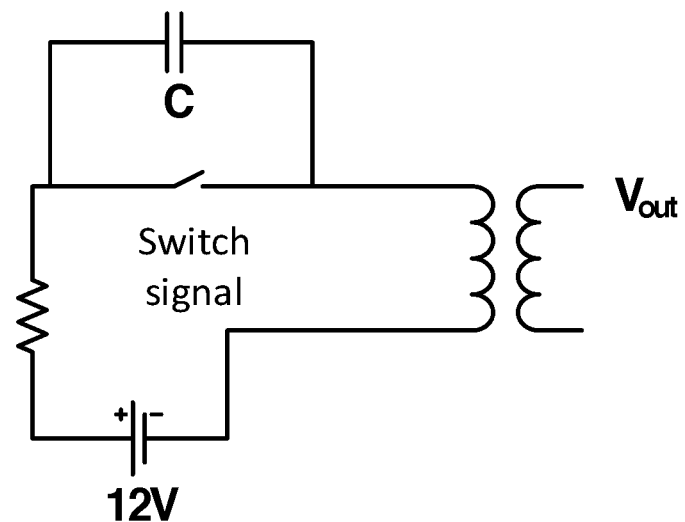

FIG. 15 shows the basic principle of the boost circuit. The vehicle power supply is 12 V. The DC power is turned into AC through a high-frequency switching signal. The voltage is boosted through a converter with AC as input. $V_{out}$ in FIG. 15 is the boosted voltage.

The electromagnetic wave generation circuit is a feedback oscillation circuit. Devices in the feedback oscillation circuits include but are not limited to avalanche diodes, bulk effect diodes, bipolar diodes, field-effect diodes, and laterally diffused metal oxide semiconductors.

The power device includes transistors and field effect diodes, such as GaAs-HEMT, GaN-HEMT, GaAs-MESFET, SiGe-HBT, InP-HBT, GaAs-HBT, LDMOS. For stable output, the heat sink and temperature compensation circuit are used for the high heat generated from the power devices.

Figure 11:
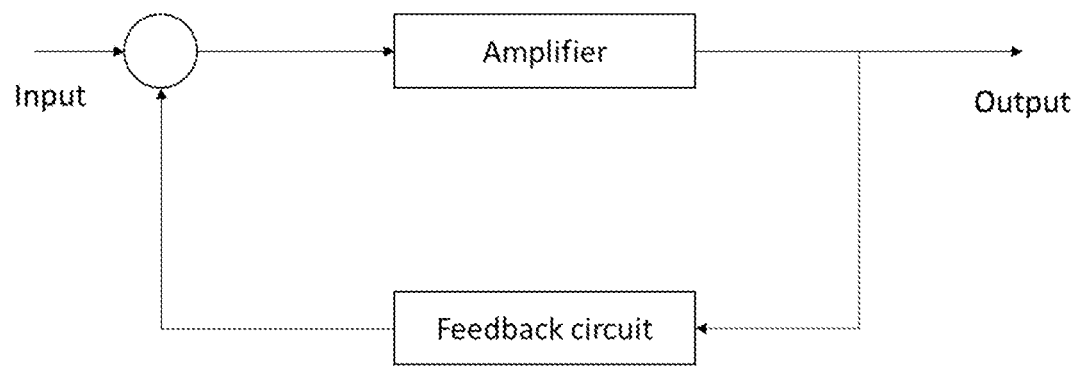

FIG. 11 shows the principle of a said feedback circuit, which is one of the means of generating stable electromagnetic waves. As shown, the feedback voltage is also the output voltage. Through the amplifier, the output power of the circuit is amplified in multiple times. The feedback is negative feedback, through which the amplification stabilizes the output power at the desired level.

The following explains how to control the frequency of the electromagnetic wave in FIG. 11.

Figure 13:
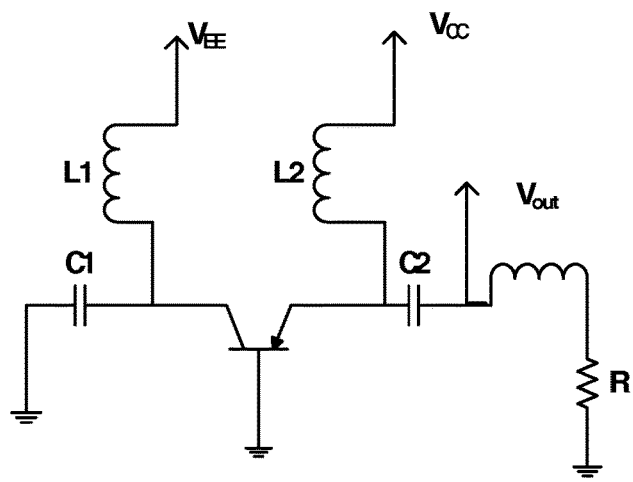

FIG. 13 shows one example implementation of the feedback oscillation circuit as a bipolar oscillation circuit. $V_{EE}$ and $V_{CC}$ are the power supplies, which are the output voltage from the boost circuit. $V_{out}$ is the output voltage of the electromagnetic wave. Based on the working principle of an LC oscillating circuit, the coil stops changes in current when the capacitor discharges to the coil. The quality factor (Q value) decreases when the current amplification factor increases, of which the energy transfers from the electric field to the magnetic field. The square of frequency is inversely proportional to the coil L and the capacitor C. Hence, the frequency is adjusted by changing the inductance and/or the capacitance. For example, the frequency of the output electromagnetic wave from the oscillation circuit is increased by reducing the capacitance of the capacitor or the inductance in coil L.

Figure 14:
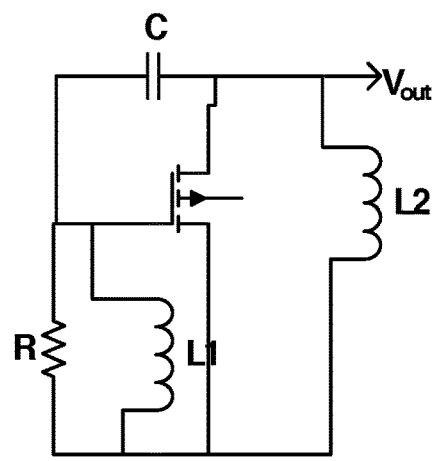

FIG. 14 shows another example implementation of the feedback oscillation circuit as a GaAs MESFET oscillation circuit. Similar to the bipolar implementation above, the output electromagnetic wave frequency is changed by adjusting the capacitance and the inductance.

The means of implementing the oscillation circuits are not limited to the above.

Figure 12:
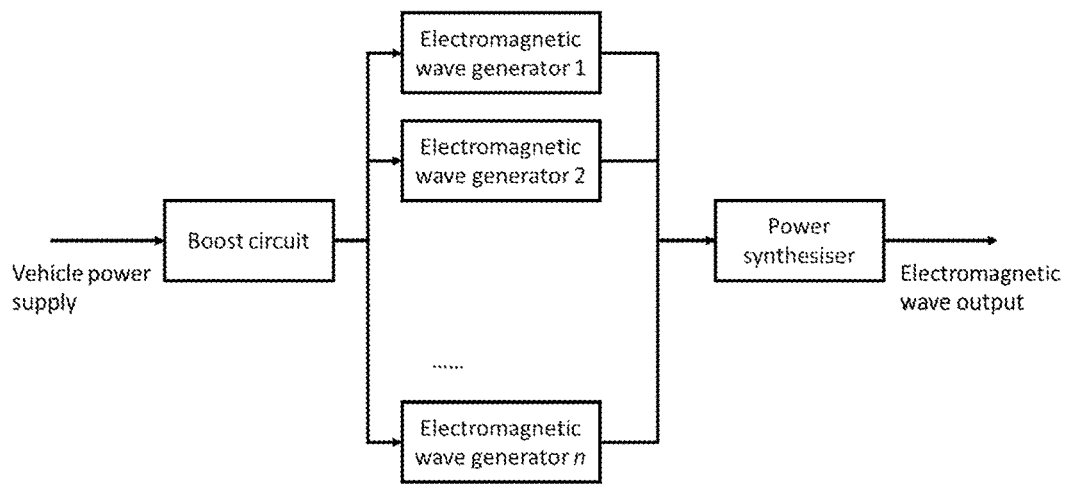

FIG. 12 is another example of the electromagnetic wave source, which includes a DC power supply, multiple electromagnetic wave generators in parallel and a power device.

The power supply is the vehicle power supply. Whether the boost circuit is needed depends on whether the vehicle power supply can provide enough voltage. The output power of the multiple electromagnetic wave generators is the sum of all outputs from the individual electromagnetic wave generators. The number of generators is not limited. The power device is used to adjust the phases of the electromagnetic waves to the same.

Any circuit that can generate electromagnetic waves can be used, including those shown in FIG. 13 and FIG. 14. The present invention is not limited to the ones shown in FIG. 13 and FIG. 14.

The following is an example application of the coupling module in the HCEMVI engine.

Figure 2:
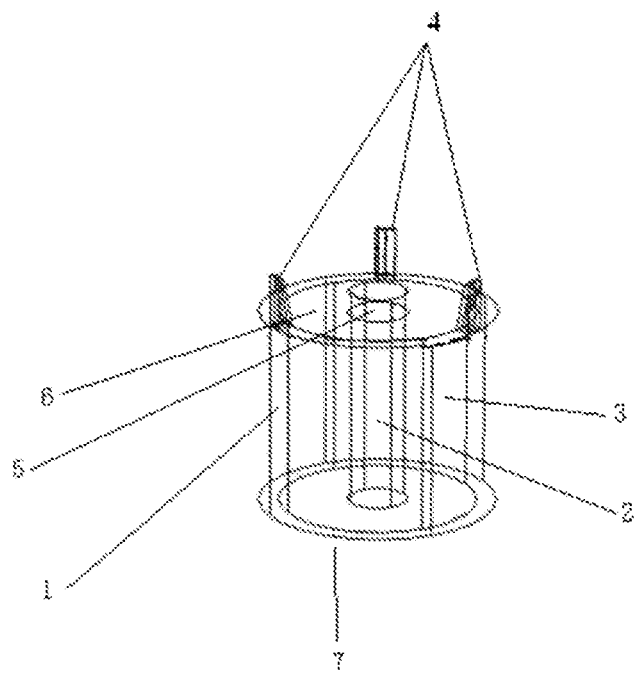
Figure 3:
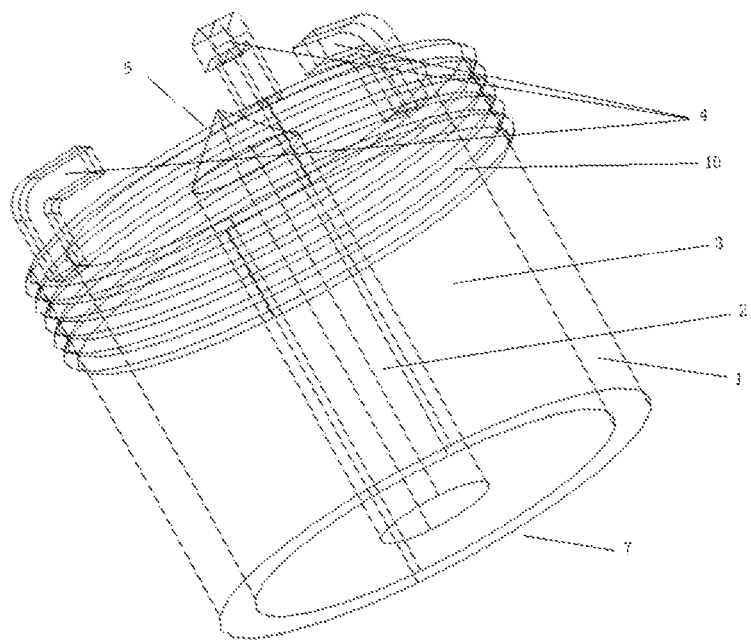

As shown in FIG. 2 and FIG. 3, the coupling module includes a transmission line and extended antennas in the direction of the transmission line.

The center conductor 2 is in the central axis of the transmission line. The insulation layer 3 covers the central axis. The outer-layer conductor 1 covers around the insulation layer 3. The antennas include the center antenna 5 and the outer-layer antenna 4, which is around the center antenna 5. The center antenna 5 is the extension of the center conductor 2, which extends into the cylinder. The outer-layer antenna 4 is the extension of the outer-layer conductor 1, which also extends into the cylinder. The number of outer-layer antennas 4 is no less than the number of center antenna 5.

The cylinder contains the cylinder head 9 and the cylinder body 8. The piston moves in the cylinder body 8. When it moves close to the TDC, the cavity formed by the cylinder head 9 with the piston is where the resonance and the ignition occur. The electromagnetic wave is injected into the cavity through the coupling antenna in the port as used by a normal sparkplug.

The coupling antennas at the outer-layer and the transmission line in the center are separated by the insulation layer 6. When the insulation layer is of non-heat-resistant material, the insulation layer in 6 is covered with heat insulation material, such as ceramics. If the insulation layer is of a heat-resistant material, then there is no need for extra heat resistant material.

The output impendence of the coupling module is determined by the diameter of the center conductor and the thickness of the insulating layer. These two parameters are designed to meet the requirements of impendence matching to minimize the input power of the electromagnetic wave source.

The installation size of the coupling module is the same as that of a sparkplug. In a practical application, the diameter of the center conductor 2 and the thickness of the insulating layer 3 are designed to meet the impendence matching requirements. Only the thickness of the outer-layer conductor 1 can be adjusted to suit the size and the shape of the sparkplug port.

The designs of the antenna geometry described in the present invention are for illustration only. The antennas are not limited to the illustrated. The following presents the results of the application examples to demonstrate the performance and practicability of the invention.

Figure 4:
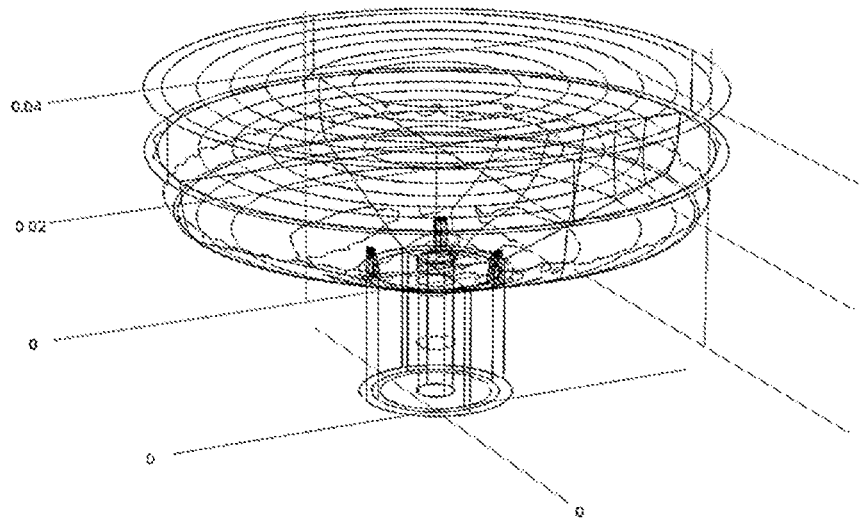
Figure 5:
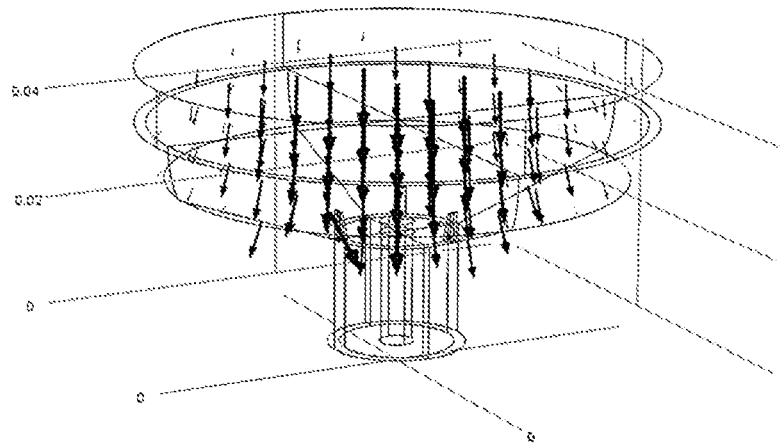
Figure 6:
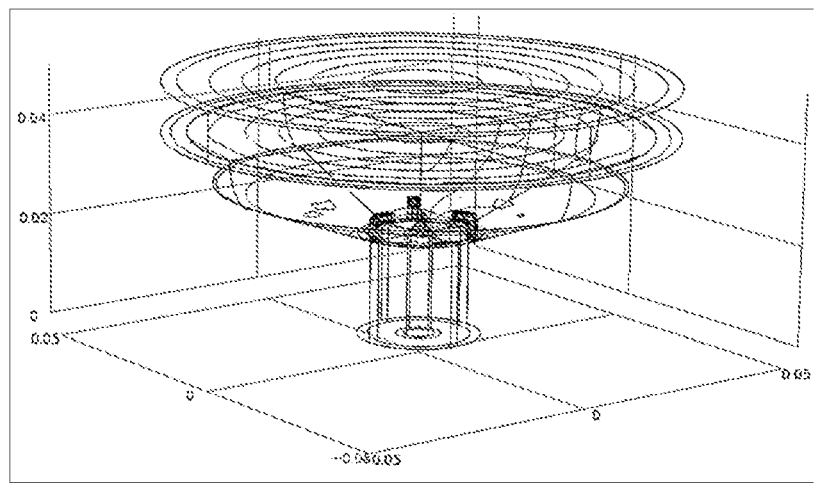
Figure 7:
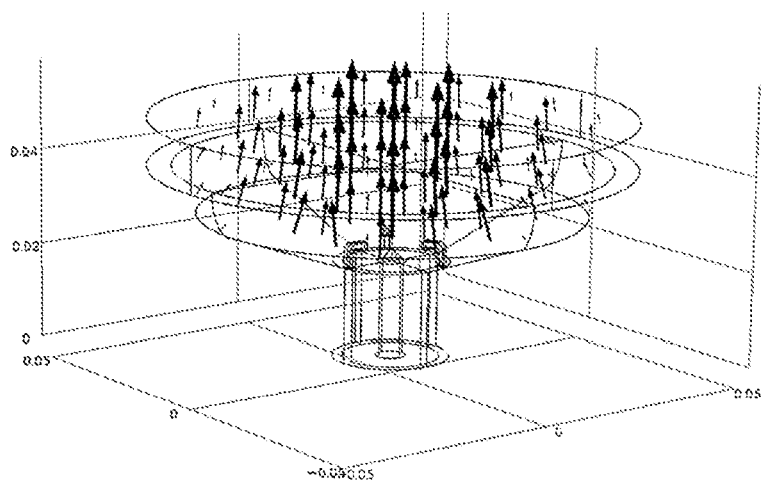

When the input power of the electromagnetic wave source is 1 W, the electric field distribution is as follows:

FIGS. 4 and 5 are the 3D electric field and the distribution of the example with the first type structure of the coupling module at resonance FIGS. 6 and 7 are 3D electric fields and distributions of the example with the second type structure of the coupling module at resonance Table 2 shows the value of the strongest point in each electric field with three different sets of antennas. The input power is set to 1 W. The strength of the electric field is over $10^5$ V/m. When the input power is over 100 W, the strength of the electric field reaches $10^6$ V/m.

The threshold intensity of ignition is $10^6$ V/m. The current vehicle power supply is adequate to power the electromagnetic wave source. The ignition method of this invention allows not only to ignite the air-fuel mixture of a fuel/air ratio as lean as 1:25, but also to use the types of fuel that are difficult to ignite, such as propane. The coupling module is not limited to the two aforementioned examples.

TABLE 2 electric field intensity when input power is 1 W

| Length of outer-layer conductor (mm) | Input frequency ($10^9$ Hz) | Distance from testing point to TDC (m) | Electric field intensity ($10^5$ V/m) |
|---|---|---|---|
| 2 | 2.5875 | 0.035 | 5.582 |
| 2.25 | 2.5852 | 0.035 | 5.917 |

Based on the theory of antennas, it is best that the length of the coupling antenna is ¼ of the wavelength of the electromagnetic wave. In the above examples, when the input power is 1 W the intensity of the resonant electric field is over $5.8 \times 10^5$ V/m.

In the present invention, the cavity of resonance is the cylinder head of an irregular shape. The resonant mode and frequency are related to the depth of the cavity, which is the distance from the cylinder head to the piston. Hence, the length of the antenna is affected by the piston position.

Studies show that the center antenna 5 is related to the electromagnetic wave wavelength. The wavelength is related to the depth of the cylinder, which is the distance from the cylinder head to the piston. The length L1 of the center antenna should be greater than zero and less than 50% of the cylinder depth. Additionally, the length L1 should be in the range of ⅓ of the wavelength±10%.

The optimum length of L1 is close to ⅓ of the wavelength of the electromagnetic wave (usually 30% to 35%). Studies reveal that the best value of the length L1 is 33.74% of the wavelength. When the input power is 1 W, the maximum value of the intensity of electric field is $1.18 \times 10^6$ V/m, which is much higher than the traditional theoretical number.

In the application examples, the electromagnetic wave source is powered by the vehicle power supply and extra power supply is not needed. An extra power supply may be necessary when a magnetron is used as the electromagnetic wave source. Adopting the present invention would not need the extra power supply and hence lead to cost savings.

The frequency of electromagnetic wave in the system is controllable. It can be applied to all kinds of engines with different ignition advance angles. The frequency of the electromagnetic wave source is set to the resonant frequency or its closest possible of the cylinder head at the ignition advance angle. The ignition timing is almost the same as the resonant time. Thus the chance for mistuning is reduced and ignition is guaranteed. If a magnetron is used, the frequency of the electromagnetic wave from the magnetron is fixed, usually at 2.45 GHz. The cylinder will be at mistune for most of the time with the intensity of the electric field decreasing rapidly at mistune. In this case, ignition is difficult due to insufficient energy, and hence this invention uses a variable frequency circuit.

Impedance matching is also taken into consideration in this invention. With impedance matching, the reflection of electromagnetic wave is at the lowest, which increases the chance for ignition. The input power of the electromagnetic wave is no more than 200 W.

Finally, ignition timing is controlled precisely in this invention by controlling the time of the generation and injection of the electromagnetic wave. The resonance and electric field form quickly after the injection of electromagnetic wave and so does ignition. Hence, generation of plasma from early injection of electromagnetic wave is low, which reduces possible decay of the electric field intensity.

Despite these application examples of this invention, any other forms including different combinations, alterations or modifications are covered in this patent. Any improvement that is based on this invention should be covered in this patent.

What are claimed are:

1. A homogenous charge electromagnetic volumetric ignition internal combustion engine with pre-mixed air and fuel, comprising:

an electromagnetic source, a cylinder, a coupling module and an engine control module; the electromagnetic wave source being operated by the engine control module to adjustably generate an electromagnetic wave;

wherein a frequency of the electromagnetic wave is set to a resonant frequency or its closest possible of a cylinder head at an ignition advance angle, and the electromagnetic wave is transmitted through the coupling module into the cylinder with the cylinder head;

wherein the resonant frequency is determined by a fuel type and the ignition advance angle of the homogenous charge electromagnetic volumetric ignition internal combustion engine, the ignition advance angle is determined by an air-fuel ratio, an engine speed and a sensitivity of resonant frequency of the homogenous charge electromagnetic volumetric ignition internal combustion engine, and the sensitivity of resonant frequency is defined as how long a mistuning happens after a resonance has occurred in the cylinder.

2. The homogenous charge electromagnetic field ignition internal combustion engine according to claim 1, wherein the homogenous charge electromagnetic field ignition internal combustion engine is compatible with multiple fuels, which comprise but are not limited to gasoline, diesel, natural gas and biofuels.

3. The homogenous charge electromagnetic field ignition internal combustion engine according to claim 1, wherein the combustion mixture of air and fuel is pre-mixed before ignition.

4. The homogenous charge electromagnetic field ignition internal combustion engine according to claim 1, wherein the engine control module monitors the engine speed and the piston position and thus determines the operation timing of the electromagnetic wave source.

5. The homogenous charge electromagnetic field ignition internal combustion engine according to claim 1, wherein the frequency of electromagnetic wave generated by the electromagnetic wave source is set to the same as the resonant frequency or its closest possible of the cylinder head with the piston at the ignition advance angle.

6. The homogenous charge electromagnetic field ignition internal combustion engine according to claim 1, wherein the emission power of the electromagnetic wave source is between 100 W and 200 W.

7. The homogenous charge electromagnetic field ignition internal combustion engine according to claim 1, wherein the frequency of the electromagnetic wave is adjustable and its range can be set according to the international public frequency range.

8. The homogenous charge electromagnetic field ignition internal combustion engine according to claim 1, wherein when the engine control module detects the piston reaching the set position in accordance with the ignition advance angle, a turning on command is sent to the electromagnetic wave source by the engine control module.

9. The homogenous charge electromagnetic field ignition internal combustion engine according to claim 8, wherein the set position of piston is before the ignition advance angle.

10. The homogenous charge electromagnetic field ignition internal combustion engine according to claim 8, wherein the ignition advance angle is calculated to meet middle-high engine speeds.

11. The homogenous charge electromagnetic field ignition internal combustion engine according to claim 8, wherein the method to determine ignition advance angle is as follows:
   a. calculate the ignition advance angle for middle-high engine speed when CA50 occurs at −5° before the top dead center;
   b. the resonant frequency and the piston position when resonance decreases are calculated for each ignition advance angle.

12. The homogenous charge electromagnetic field ignition internal combustion engine according to claim 1, wherein the electromagnetic wave source comprises a power supply, an electromagnetic wave generator and a power device; the power supply adjusts the vehicle electric power into suitable voltage for the electromagnetic wave signal generator; the electromagnetic wave generator generates adaptable electromagnetic waves; the power device amplifies and/or modulates the electromagnetic wave.

13. The homogenous charge electromagnetic field ignition internal combustion engine according to claim 12, wherein the electromagnetic wave generator uses an oscillating circuit.

14. The homogenous charge electromagnetic field ignition internal combustion engine according to claim 12, wherein the power device is also an amplifier when the number of electromagnetic wave signal generator is one; the power device is a power combiner when the number of electromagnetic wave generators is more than one.

15. The homogenous charge electromagnetic field ignition internal combustion engine according to claim 13, wherein the oscillating circuit uses tunable capacitance and/or inductance to adjust the output frequency of the electromagnetic wave.

16. The homogenous charge electromagnetic field ignition internal combustion engine according to claim 12, wherein the power supply is from the vehicle DC power.

17. The homogenous charge electromagnetic field ignition internal combustion engine according to claim 12, wherein the power device uses semiconductors including transistors and/or field effect transistors.

18. The homogenous charge electromagnetic field ignition internal combustion engine according to claim 12, wherein the semiconductors in the electromagnetic wave signal generator are but are not limited to avalanche diodes, bulk diodes, bipolar transistors, field effect transistors and/or laterally diffused metal oxide semiconductors.

19. The homogenous charge electromagnetic field ignition internal combustion engine according to claim 12, wherein the heat sink, which absorbs and dissipates the excess heat generated by the power device, and/or the temperature compensation component, which is to compensate the error caused by high temperature, are auxiliaries to the electromagnetic wave generator.

20. The homogenous charge electromagnetic field ignition internal combustion engine according to claim 12, wherein the electromagnetic wave signal generator comprises a boost circuit and a signal generator; the boost circuit connects the signal generator to the power supply.

21. The homogenous charge electromagnetic field ignition internal combustion engine according to claim 20, wherein the boost circuit is activated when the voltage of the power supply is below the required level.

22. The homogenous charge electromagnetic field ignition internal combustion engine according to claim 1 wherein the coupling module comprises a transmission line and a coupling antenna; and the transmission line connects the coupling antenna to the electromagnetic wave source;
   the transmission line comprises a center conductor, an insulating layer and an outer-layer conductor; the center conductor is in a central axis of the transmission line, the insulating layer covers the center conductor, and the outer-layer conductor covers around the insulating layer;
   the coupling antenna comprises a center antenna and an outer-layer antenna around the center antenna, the center antenna is an extension of the center conductor and extends into the cylinder, the outer-layer antenna is an extension of the outer-layer conductor and extends into the cylinder, and the outer-layer antenna is around the center antenna in a claw-like structure.

23. The homogenous charge electromagnetic field ignition internal combustion engine according to claim 22, wherein the transmission line is a coaxial cable or a waveguide.

24. The homogenous charge electromagnetic field ignition internal combustion engine according to claim 22, wherein the size of the transmission line or the geometry of the waveguide is determined based on the geometry of the cylinder and the matching impedance of the cylinder.

25. The homogenous charge electromagnetic field ignition internal combustion engine according to claim 22, wherein a diameter of the center conductor and a thickness of the insulating layer are determined according to a size and a matching impedance of the cylinder.

26. The homogenous charge electromagnetic field ignition internal combustion engine according to claim 22, wherein the surface of the insulation layer at the connection of the antenna and the transmission line is covered with dielectric insulation material that allows the electromagnetic wave to be transmitted.

27. The homogenous charge electromagnetic field ignition internal combustion engine according to claim 22, wherein the outer-layer antenna is arranged in array configuration along the extension of the outer-layer conductor; the top end of the outer-layer antenna is open; the lateral side of the outer-layer antenna is closed and/or open around the center antenna.

28. A method of homogenous charge electromagnetic volumetric ignition, which is applied to a pre-mixed air-fuel homogenous charge electromagnetic volumetric ignition internal combustion engine, comprising:
   a. detecting a piston position reaching a present position and sending an ON signal from an engine control module to a electromagnetic wave source, wherein the electromagnetic wave is generated at the same frequency as a resonant frequency or its closest possible of a cylinder head at a preset ignition advance angle and transmitted through the coupling module, the resonant frequency is determined by a fuel type and the preset ignition advance angle of the pre-mixed air-fuel homogenous charge electromagnetic volumetric ignition internal combustion engine, the preset ignition advance angle is determined by an air-fuel ratio, an engine speed and a sensitivity of resonant frequency of the pre-mixed air-fuel homogenous charge electromagnetic volumetric ignition internal combustion engine, and the sensitivity of resonant frequency is defined as how long a mistuning happens after a resonance has occurred in the cylinder;

b. igniting bulk of an air-fuel mixture in an electromagnetic field which is created by an electromagnetic resonance inside a cylinder with the cylinder head.

29. The homogenous charge electromagnetic field ignition internal combustion method according to claim 28, wherein the homogenous charge electromagnetic field ignition internal combustion engine can use multiple fuel types including but are not limited to gasoline, diesel, natural gas, or biofuels.

30. The homogenous charge electromagnetic field ignition internal combustion engine according to claim 28, wherein the air and fuel are pre-mixed before ignition.

31. The homogenous charge electromagnetic field ignition internal combustion engine according to claim 28, wherein the power of the electromagnetic wave source is no more than 200 W and no less than 100 W; the strength of the electromagnetic field can reach the same level as $10^6$ V/m.

32. The homogenous charge electromagnetic field ignition internal combustion engine according to claim 28, wherein the preset position of the piston is before the ignition advance angle.

33. A homogenous charge electromagnetic volumetric ignition internal combustion engine with pre-mixed air and fuel, comprising:

an electromagnetic source, a cylinder, a coupling module and an engine control module; the electromagnetic wave source being operated by the engine control module to adjustably generate an electromagnetic wave;

wherein a frequency of the electromagnetic wave is set to a resonant frequency or its closest possible of a cylinder head at an ignition advance angle, and the electromagnetic wave is transmitted through the coupling module into the cylinder with the cylinder head;

wherein the coupling module comprises a transmission line and a coupling antenna, and the transmission line connects the coupling antenna to the electromagnetic wave source;

wherein the transmission line comprises a center conductor, an insulating layer and an outer-layer conductor; the center conductor is in a central axis of the transmission line, the insulating layer covers the center conductor, and the outer-layer conductor covers around the insulating layer;

wherein the coupling antenna comprises a center antenna and an outer-layer antenna around the center antenna, the center antenna is an extension of the center conductor and extends into the cylinder, and the outer-layer antenna is an extension of the outer-layer conductor and extends into the cylinder;

wherein a length of the center antenna is in a range of ⅓ of a wavelength of the electromagnetic wave±10%.

34. The homogenous charge electromagnetic field ignition internal combustion engine according to claim 33, wherein the outer-layer antenna is around the center antenna in a claw-like structure.

\* \* \* \* \*